United States Patent [19]

Saathoff et al.

[11] 4,215,188
[45] Jul. 29, 1980

[54] RECHARGEABLE ELECTROCHEMICAL CELL

[75] Inventors: Deidrich J. Saathoff, Eagan; Hanumanthiyna V. Venkatasetty, Burnsville, both of Minn.

[73] Assignee: Honeywell Inc., Minneapolis, Minn.

[21] Appl. No.: 66,155

[22] Filed: Aug. 13, 1979

[51] Int. Cl.$^2$ ........................................... H01M 10/40
[52] U.S. Cl. ..................................... 429/194; 429/199
[58] Field of Search ................ 429/194, 199, 188, 197

[56] References Cited

U.S. PATENT DOCUMENTS

| 3,423,242 | 1/1969 | Meyers et al. | 429/194 |
|---|---|---|---|
| 3,877,988 | 4/1975 | Dey et al. | 429/194 |
| 3,918,988 | 11/1975 | Abens | 429/194 |
| 4,104,451 | 8/1978 | Klemann et al. | 429/194 |

Primary Examiner—Anthony Skapars
Attorney, Agent, or Firm—John S. Munday

[57] ABSTRACT

An electrolyte solution for use in rechargeable electrochemical cells having nickel substrate as working electrode and lithium counter electrode and an electrochemically active amount of $LiAsF_6$ dissolved in dimethyl sulfite and a rechargeability improving amount of lithium carbonate, $Li_2CO_3$, contained therein to form electrolyte solution, said solution being capable of passing through a molecular sieve of less than about 5 Angstroms has been developed. A preferred embodiment includes a one molar solution of the $LiAsF_6$ and from about 0.07 to 0.14 molar solution of $Li_2CO_3$. The electrolyte solution has 85–90 percent efficiency for cycling lithium on nickel substrate.

5 Claims, No Drawings

RECHARGEABLE ELECTROCHEMICAL CELL

BACKGROUND OF THE INVENTION

Lithium batteries have become useful in many commercial applications due to the high energy availability between the lithium anode and the variety of cathodes employed in lithium batteries. By far the greatest portion of the lithium battery industry, however, is in the primary active batteries. Lithium batteries have demonstrated a high degree of shelf life and these batteries are becoming accepted as reliable power sources.

However, one of the main concerns about lithium batteries is the relatively high cost of manufacture. In many instances, the high energy and substantially longer life does not justify the expense of the use of lithium batteries. This is particularly true when alternate power sources such as rechargeable batteries can be employed. Operating power costs from lithium batteries is excessive when rechargeable batteries aren't employed.

In order to further develop the lithium battery industry, what is particularly needed is a lithium battery which is capable of operating on a secondary mode. Rechargeable lithium batteries would have the inherent high energy and long life capabilities of their primary versions while eliminating the excessive high cost due to replacement. One of the major problems to be solved in lithium rechargeable electrochemical power sources, however, is the improvement of electrolyte solution with suitable additives from which lithium can be deposited and dissolved and redeposited with efficiency. Stated another way, if the lithium battery cannot be recharged more than a few times and at only a relatively poor efficiency, it is not an effective substitute for other rechargeable cells. Another problem which arises in conventional for prior art lithium rechargeable batteries is that the electrodeposited lithium is more reactive towards the solvent and/or the electrolyte solution than is the bulk lithium comprising the lithium electrode. Thus, the lithium recovery efficiency is very low on wet stand.

Accordingly, it is an object of this invention to provide a rechargeable lithium battery which is capable of repeated cycling with high efficiency.

Another object of this invention is to provide a lithium battery which is rechargeable and which has an improved recovery efficiency on wet stand.

Other objects will appear hereinafter.

THE INVENTION

It has now been discovered that the above and other objects of the present invention can be accomplished in the following manner. Specifically, a new electrolyte has been discovered which is highly suitable for use in rechargeable electrochemical cells having a lithium anode and a depolarizer.

The electrolyte comprises an electrochemically active amount of $LiAsF_6$ dissolved in dimethyl sulfite. The electrolyte further contains a rechargeability improving amount of $Li_2CO_3$. The electrolyte solution is passed through a molecular sieve having a pore diameter of less than about 5 Angstroms.

As stated above, an electrochemically active amount of $LiAsF_6$ is employed. Normally, this amount ranges from about 0.2 molar to about 2.0 molar $LiAsF_6$ in dimethyl sulfite. Most preferred is a solution of about 1.0 molar $LiAsF_6$.

The rechargeability improving amount of $Li_2CO_3$ may range from as little as 0.01 molar to as much as 0.27 molar, although more $Li_2CO_3$ could be employed without departing from the spirit of the present invention. The preferred range of the $Li_2CO_3$ is from about 0.07 molar to about 0.14 molar.

The purpose of passing the electrolyte solution through a molecular sieve is to remove any trace of water and to insure proper solubility of the particular salt employed in the electrolyte and to remove any impurities which might be present which would prevent proper deposition of the lithium during the electrolytic process.

The electrolyte is admirably suited for use in rechargeable electrochemical cell having a lithium anode. A wide variety of cathodes or depolarizers may be employed and it is contemplated that any depolarizer which is electrochemically compatible with the lithium anode in the electrolyte solution should be employed in the present invention. Specific examples of suitable depolarizers are: titanium disulfide ($TiS_2$) vanadium pentoxide ($V_2O_5$), niobium selenide ($NbSe_3$), $Na_{.18}TiS_2$ and $Na_{.18}TaS_2$ and the like. Other cathodes or depolarizers which can be employed are set forth by way of example in U.S. Pat. No. 3,423,242.

In order to demonstrate the efficiencies of the present invention, a number of experiments were performed to determine the efficiency of the rechargeability feature of the electrolyte. Plating cells were constructed in the laboratory to determine the relative efficiency of deposition and dissolution on nickel substrate working electrode, lithium counter electrode and lithium reference electrode. In each experiment, the procedures were performed in the same manner, with the only difference being the composition of the electrolyte solution.

In the first experiment, a one molar solution of $LiAsF_6$ in dimethyl sulfite was employed. It had a 65 percent efficiency for lithium deposition and dissolution on a nickel substrate. On cycling, the efficiency was 60 percent and on wet stand for 800 seconds, the efficiency was about 50 percent.

In a second experiment, the same electrolyte solution of experiment one was employed with the additional step of treating the solution with a molecular sieve having a pore size of approximately 5 Angstroms prior to the cycling tests. This solution had an efficiency of 80 percent. On cycling, the efficiency is 80 percent and on wet stand for 800 seconds, the efficiency is 63 percent.

In the third experiment, a one molar solution of $LiAsF_6$ in dimethyl sulfite was employed which further contained 0.07 molar $Li_2CO_3$ and was treated with a 5 Angstrom molecular sieve. This superior efficiency of 85–90 percent for lithium deposition and dissolution demonstrates the surprising and effective results of the present invention. On cycling, the efficiency is between 85–90 percent and on wet stand for 800 seconds, it is 73 percent.

Similarly, a fourth experiment with an electrolyte solution of one molar $LiAsF_6$ in dimethyl sulfite was employed containing 0.14 molar $Li_2CO_3$, again with a 5 Angstrom molecular sieve treatment. The efficiency for this experiment was 88–90 percent and it was 88–90 percent on cycling, once again demonstrating the surprising and superior results achieved by the present invention.

In articles written by R. D. Rauh and S. B. Brummer et al in the Journal of ElectrochemActa 22, 75 (1977) and page 85 of the same volume, several proposed electrochemical systems were set forth for lithium cycling efficiency. In a one molar $LiClO_4$ in propylene carbonate solution with nitromethane, cycling efficiency varied from about 75 to 55 percent. In methyl acetate with nitromethane, cycling efficiency varies from 30 to 70 percent.

As has been stated above, the present invention provides an electrolyte for use in a rechargeable electrochemical cell which permits a high degree of efficiency in lithium plating and dissolution. Other experiments measuring the recovery efficiency on wet stand for periods of time up to 800 seconds demonstrate an efficiency of about 73 percent. Without the use of the $Li_2CO_3$, efficiencies were only 63 percent and the efficiency on cycling sometimes decreased to 40 percent.

Having thus described the invention, what is claimed is:

1. An electrolyte for use in rechargeable electrochemical cells having a lithium and a depolarizer, comprising:
   an electrochemically active amount of $LiAsF_6$ dissolved in dimethyl sulfite and a rechargeability improving amount of $Li_2CO_3$ contained therein to form an electrolyte solution, said solution being capable of passing through a molecular sieve on less than 5 Angstroms.

2. The cell of claim 1 wherein the amount of $LiAsF_6$ ranges from 0.2 molar to 2.0 molar.

3. The cell of claim 2 wherein the amount of $LiAsF_6$ range is approximately 1.0 molar.

4. The cell of claim 1 wherein the amount of $Li_2CO_3$ ranges from 0.01 to 0.27 molar.

5. The cell of claim 4 when the amount of $Li_2CO_3$ ranges from 0.07 to 0.14 molar.

* * * * *